United States Patent
Guddee

(10) Patent No.: US 8,231,783 B1
(45) Date of Patent: Jul. 31, 2012

(54) OIL FILTER SUBASSEMBLY WITH QUICK CONNECT AND DISCONNECT REPLACEMENT FILTER ELEMENT

(76) Inventor: Robert H. Guddee, Escondido, CA (US)

( * ) Notice: Subject to any disclaimer, the term of this patent is extended or adjusted under 35 U.S.C. 154(b) by 568 days.

(21) Appl. No.: 12/458,691

(22) Filed: Jul. 20, 2009

Related U.S. Application Data

(60) Provisional application No. 61/082,467, filed on Jul. 21, 2008.

(51) Int. Cl.
  *B01D 27/08* (2006.01)
  *B01D 35/30* (2006.01)

(52) U.S. Cl. ............... 210/232; 210/444; 210/450

(58) Field of Classification Search ............ 210/232, 210/444, 450
See application file for complete search history.

(56) References Cited

U.S. PATENT DOCUMENTS

| | | | |
|---|---|---|---|
| 2,407,046 A * | 9/1946 | Vokes | 210/415 |
| 5,725,621 A * | 3/1998 | Pruette et al. | 55/377 |
| 7,264,717 B2 * | 9/2007 | Gould et al. | 210/232 |
| 7,871,515 B2 * | 1/2011 | Brandt et al. | 210/232 |
| 2002/0100721 A1 * | 8/2002 | Huxtable et al. | 210/323.2 |
| 2008/0078716 A1 | 4/2008 | Farmer | |

* cited by examiner

*Primary Examiner* — Thomas M Lithgow
(74) *Attorney, Agent, or Firm* — Shlesinger, Arkwright & Garvey LLP

(57) ABSTRACT

An oil filter subassembly comprises a filter head; an orifice fitting attached to the filter head; and a filter element including a cap attached to the orifice fitting. The orifice fitting includes first and second radially disposed pins and a seal disposed above the pins. The cap includes a central opening having a cylindrical wall, the wall including first and second L-shaped grooves having vertical and horizontal portions, the grooves being oppositely disposed from each other, the horizontal portion including an upper side wall extending upwardly away from the vertical groove portion to provide a cam surface. The cap is configured to compress the seal, thereby to provide a downward bias force on the cap. The pins are configured to move downwardly within the vertical groove portions and positionable within the respective horizontal groove portions, the cam surface tending to push down on the respective pin from the bias force.

15 Claims, 4 Drawing Sheets

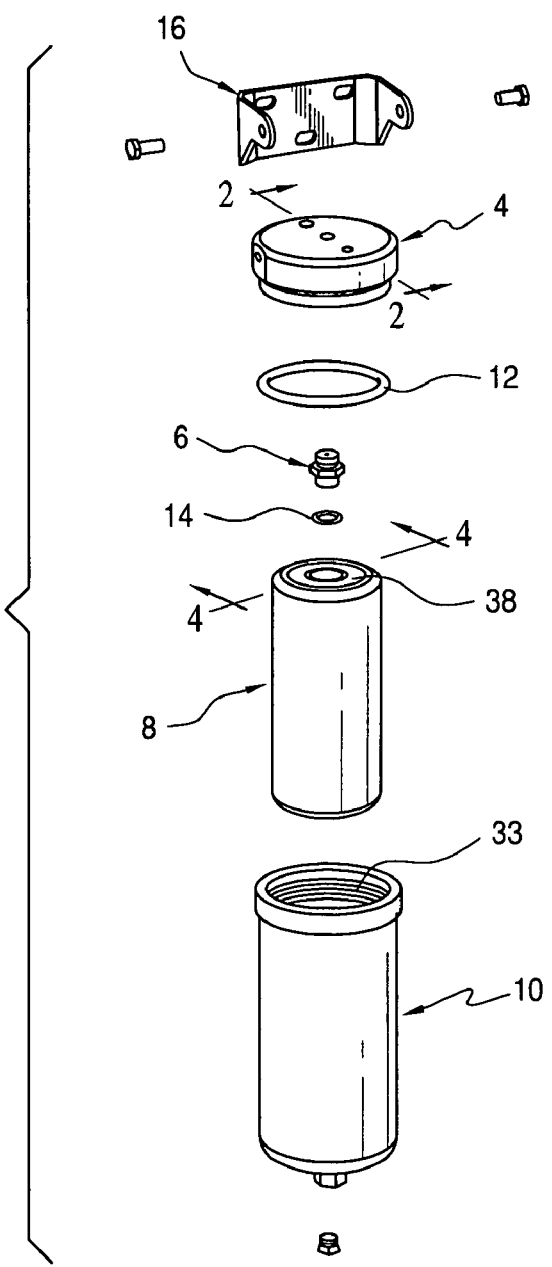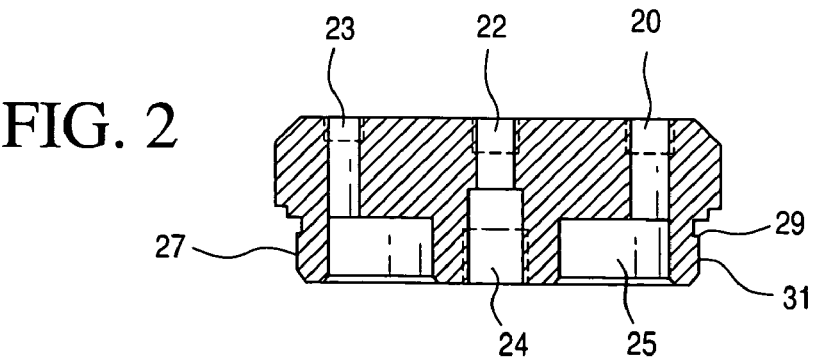

OIL FILTER SUBASSEMBLY WITH QUICK CONNECT AND DISCONNECT REPLACEMENT FILTER ELEMENT

RELATED APPLICATION

This is a nonprovisional application claiming the benefit of provisional application Ser. No. 61/082,467, filed Jul. 21, 2008, hereby incorporated by reference.

FIELD OF THE INVENTION

The present invention relates generally to an oil filter assembly and specifically to an oil bypass filter assembly and method for removing or replacing the filter element in such assembly.

BACKGROUND OF THE INVENTION

Oil filters require service of the filter element by removal and replacement or cleaning. The servicing of the filter element by removal and replacement can be awkward and time consuming. Prior art methods of attachment are mostly done through threaded type means of attachments. An example of a bypass oil filter system is disclosed in published application No. US 2008/0078716.

SUMMARY OF THE INVENTION

The present invention provides an oil filter subassembly comprising a filter head; an orifice fitting attached to the filter head; and a filter element including a cap attached to the orifice fitting. The orifice fitting includes first and second radially disposed pins and a seal disposed above the pins. The cap includes a central opening having a cylindrical wall, the wall including first and second L-shaped grooves having vertical and horizontal portions, the grooves being oppositely disposed from each other, the horizontal portion including an upper side wall extending upwardly away from the vertical groove portion to provide a cam surface. The cap is configured to compress the seal, thereby to provide a downward bias force on the cap. The pins are configured to move downwardly within the vertical groove portions and positionable within the respective horizontal groove portions, the cam surface tending to push down on the respective pin from the bias force.

BRIEF DESCRIPTION OF THE DRAWINGS

FIG. 1 is a perspective assembly view of an oil bypass filter incorporating an embodiment of the present invention.

FIG. 2 is a cross-section view of a filter head along line 2-2 in FIG. 1.

DETAILED DESCRIPTION OF THE INVENTION

Figure 3:
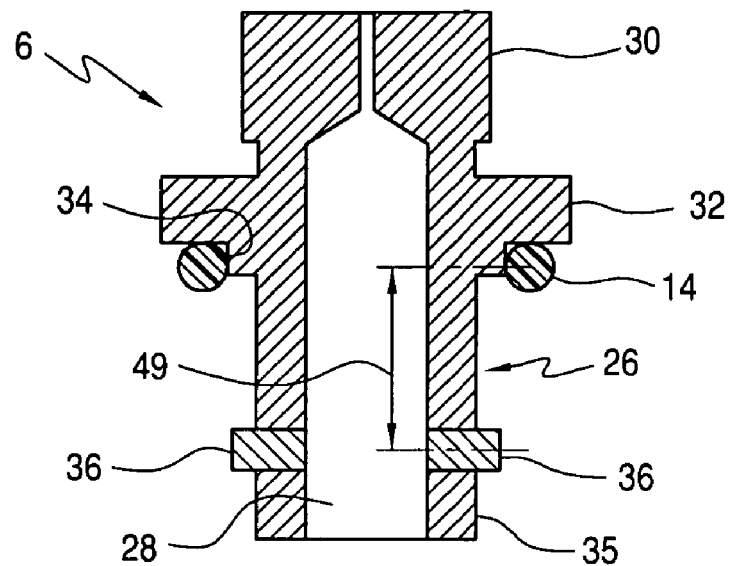
FIG. 3 is a cross-sectional view of an orifice fitting showing an embodiment of the present invention.

A bypass filter assembly 2 is disclosed in FIG. 1. The assembly 2 includes a filter head 4, an orifice fitting 6, filter element 8, a canister 10, and resilient O-ring seals 12 and 14. The assembly is attached to a vehicle structure with a bracket 16.

Referring to FIG. 2, the filter head 4 comprises a body 18 having an inlet 20 and an outlet 22. The outlet 22 has a threaded portion 24 to which the orifice fitting 6 is threaded. An auxiliary opening 23 may be plugged or used. The inlet 20 communicates with a circumferential cavity 25 that communicates with the interior of the canister 10. The body 18 includes a side wall 27 provided with a groove 29. The groove 29 provides a seat for the seal 12. The side wall 27 includes outside threads 31 for cooperating with inside threads 33 on an upper inside edge portion of the canister 10.

Figure 4:
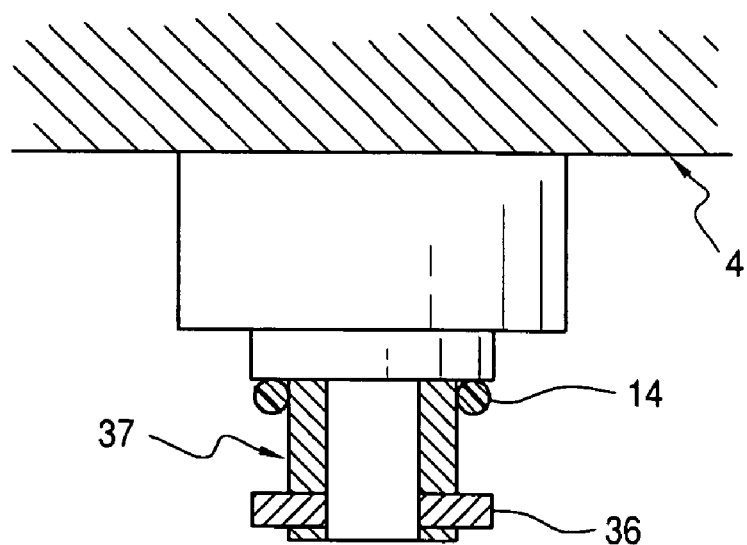
FIG. 4 is partial cross-section of an orifice fitting attached to a filter head.

Referring to FIG. 3, the orifice fitting 6 includes a body 26 with a central opening 28 that communicates with the outlet 22. The body 26 has a threaded portion 30 that screws onto the threaded portion 24 of the filter head 4. Radially extending hexagonal flange portion 32 provides a stop against the filter head body 18. The lower part of the flange portion 32 provides a seat 34 for the O-ring seal 14. Pins 36 are preferably doweled diametrically into the lower cylindrical portion 35 of the orifice fitting body 26 for an even distribution of forces, as will be explained below. More than two pins 36 may be provided, in which case the pins would be evenly disposed circumferentially on the cylindrical surface of the cylindrical portion 35. A slightly modified orifice fitting 37 attached to a filter head is shown in FIG. 4.

Figure 5:
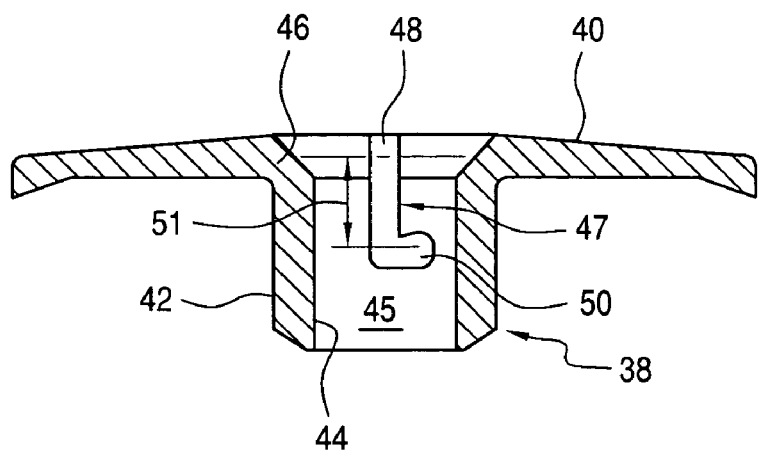
FIG. 5 is a partial cross-sectional view along line 4-4 in FIG. 1 of a filter element cap showing an embodiment of the present invention.
Figure 6:
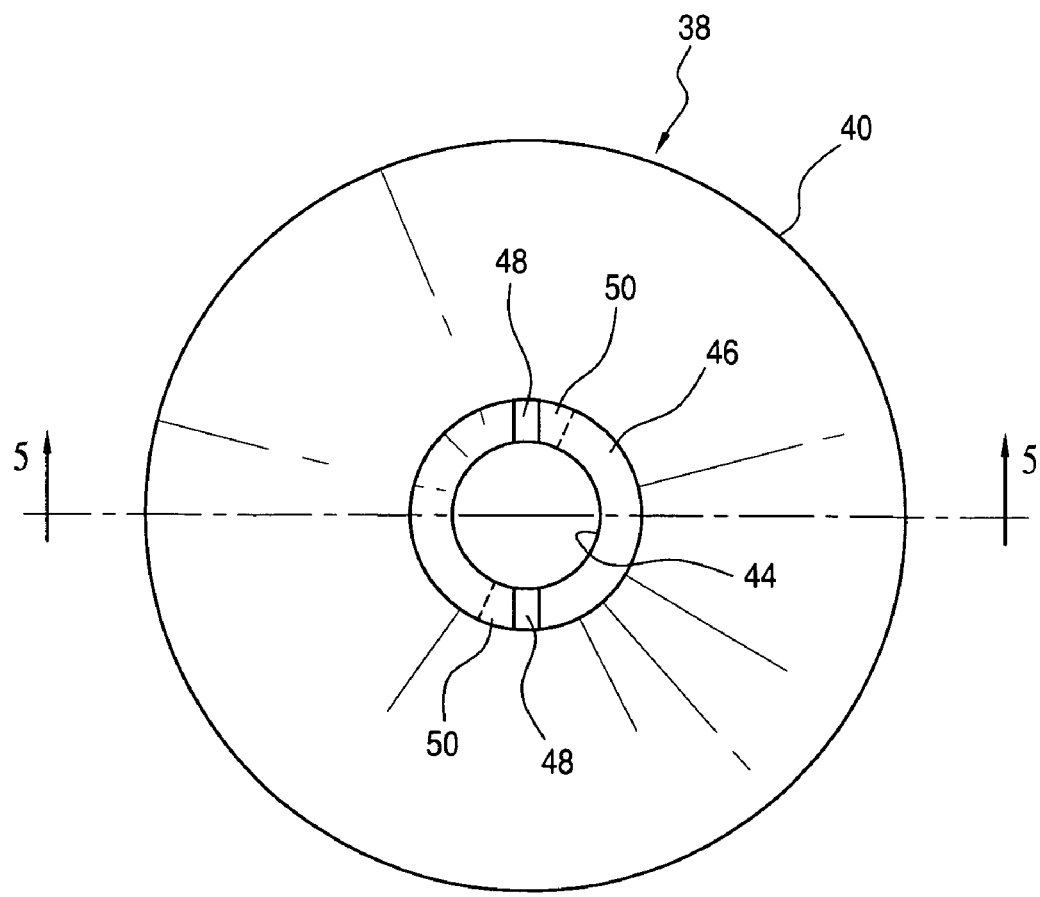
FIG. 6 is top view of FIG. 4.

The filter element 8 has a cap 38, as shown in FIGS. 5 and 6. The cap 38 has a circular cap portion 40 and centrally located cylindrical sleeve portion 42 with a cylindrical opening 44 and a frusto-conical edge surface at the cap portion 40. The opening 44 has a cylindrical surface 45 provided with oppositely disposed substantially L-shaped grooves 47. The grooves 47 each has a vertically extending portion 48 and a horizontally extending portion 50. The portions 48 are circumferentially aligned with the pins 36. The distance 49 between the seal 17 and the pins 36 is slightly shorter than the distance 51 between the surface 46 and the horizontal groove 50 to provide compression of the seal 14 and locking of the pins 36 inside the horizontal grooves 50.

Figure 7:
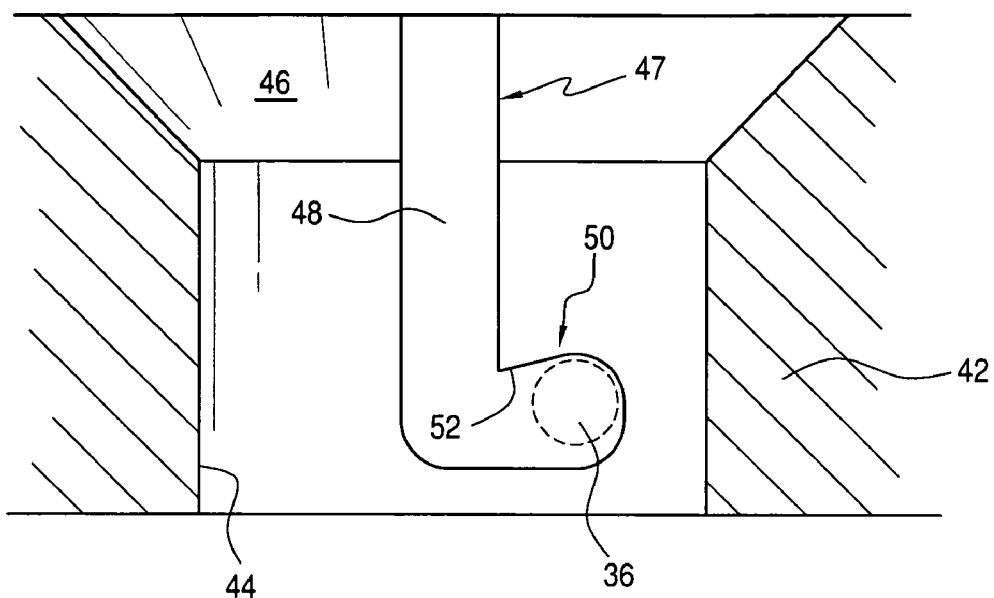
FIG. 7 is an enlarged view of a portion of FIG. 4.

Referring to FIG. 7, the horizontal groove 50 has an upper side wall 52 that ramps upwardly away from the vertical groove portion 48, providing a cam surface to capture the respective pin 36 within the groove portion 50. Due to the compression of the seal 14 by the frusto-conical surface 46, a downward bias force will be exerted by the wall 52 on the pin 36, causing the pin 36 to ride up the cam surface of the side wall 52 toward the end of the groove 50, thereby prevent inadvertent movement and release of the pin 36 into the vertical groove portion 48.

In operation, the filter element 8 is positioned so as to receive the orifice fitting within the opening 44. The pins 36 are lined up with the vertical groove portions 48. The filter element 8 is pushed, compressing the seal 14 until the pins 36 reaches the bottom end of the groove portions 48, at which point the filter element 8 is turned a few degrees in the direction of the horizontal groove portions 50 until the pins 36 are positioned at the end of the horizontal groove portions 50 where the pins 36 are locked in place by the cam surface 52. The O-ring seal 14 engages the frusto-conical surface 46, thereby providing a seal between the inlet 20 and the outlet 22. The balanced force created by the compression of the seal 14 provides for a secure sealed connection. The compression of the seal 14 provides a biasing force to keep the pins 36 captured within the horizontal groove portions 50. The horizontal groove portions 50 hold the replacement filter element in place and gives the confidence that it is secure and tight.

Figure 8:
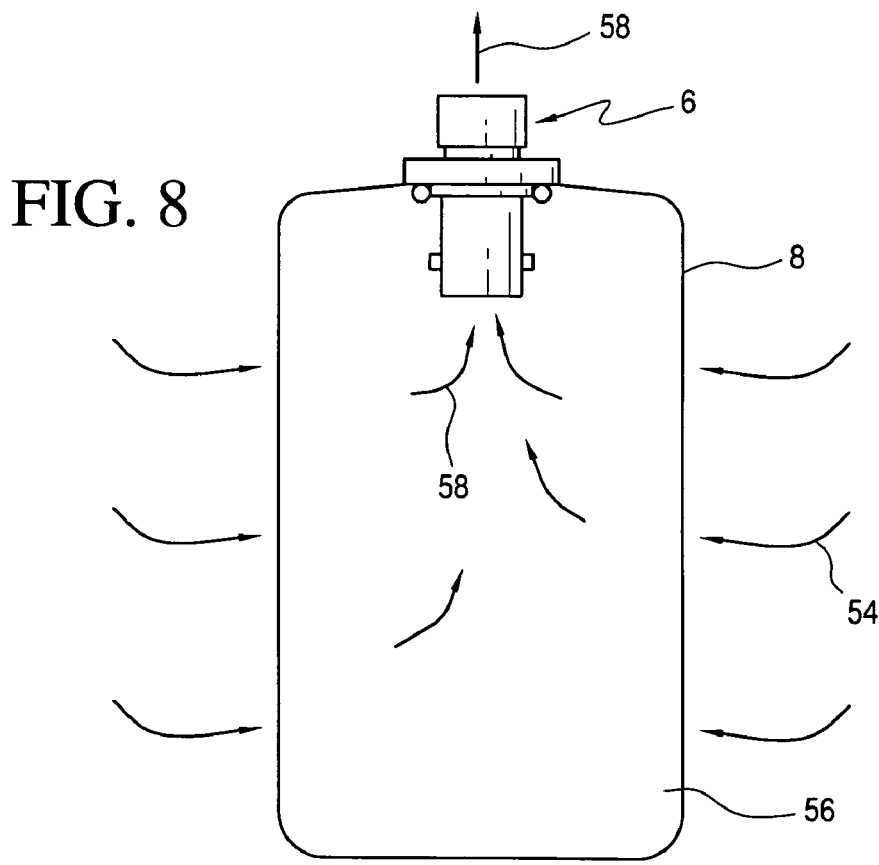
FIG. 8 is a schematic diagram of oil flow through the filter element.

Referring to FIG. 8, incoming oil 54 flows through a filter media 56 and emerges as filtered oil 58 to the outlet through the orifice fitting 6.

It will become apparent from the foregoing description that the present invention provides for a quick and easy way to remove or replace a bypass oil filter element that involves a "snap in place" action and feel. This allows the replacement element to be quickly, securely and confidently put into proper position. The present invention advantageously makes the chore of oil and filter element changes faster with less potential error in the attachment of the filter element.

Although the present invention is described using a bypass oil filter, it should be understood that it is equally applicable to any oil filter element replacement to provide for a quick, positive attachment to the filter head with just a few degrees of turn.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An oil filter subassembly, comprising:
   a) a filter head;
   b) an orifice fitting attached to said filter head;
   c) a filter element including a cap attached to said orifice fitting;
   d) said orifice fitting including first and second radially disposed pins and a seal disposed above said pins;
   e) said cap including a central opening having a cylindrical wall, said wall including first and second L-shaped grooves having vertical and horizontal portions, said grooves being oppositely disposed from each other, said horizontal portion including an upper side wall extending upwardly away from said vertical groove portion to provide a cam surface;
   f) said cap being configured to compress said seal, thereby to provide a downward bias force on said cap; and
   g) said pins are configured to move downwardly within said vertical groove portions and positionable within the respective horizontal groove portions, said cam surface tending to push down on said respective pin from the bias force.

2. An oil filter subassembly as in claim 1, wherein:
   a) said central opening includes a frusto-conical surface; and
   b) said seal is engaged by said frusto-conical surface when said filter element is attached to said orifice fitting.

3. An oil filter subassembly as in claim 2, wherein:
   a) said orifice fitting includes a radial flange; and
   b) said seal is disposed below said flange.

4. An oil filter subassembly as in claim 2, wherein said seal is an O-ring.

5. An oil filter subassembly as in claim 1, wherein said pins are doweled radially into said orifice fitting.

6. An oil filter assembly, comprising:
   a) a filter head;
   b) an orifice fitting attached to said filter head;
   c) a filter element including a cap attached to said orifice fitting;
   d) a canister attached to said filter head for enclosing said filter element;
   e) said orifice fitting including first and second radially disposed pins and a seal disposed above said pins;
   f) said cap including a central opening having a cylindrical wall, said wall including first and second L-shaped grooves having vertical and horizontal portions, said grooves being oppositely disposed from each other, said horizontal portion including an upper side wall extending upwardly away from said vertical groove portion to provide a cam surface;
   g) said cap being configured to compress said seal, thereby to provide a downward bias force on said cap; and
   h) said pins are configured to move downwardly within said vertical groove portions and positionable within the respective horizontal groove portions, said cam surface tending to push down on said respective pin from the bias force.

7. An oil filter assembly as in claim 6, wherein said filter head includes a central outlet opening and an inlet opening disposed radially spaced from said outlet opening.

8. An oil filter assembly as in claim 7, wherein said central outlet opening includes bottom inside threads for cooperating with outside threads on said orifice fitting.

9. An oil filter assembly as in claim 7, wherein:
   a) said filter head includes a circumferential cavity communicating with said inlet opening; and
   b) said groove is disposed on a bottom portion of said filter head.

10. An oil filter assembly as in claim 6, wherein:
    a) said filter head includes a side wall;
    b) side wall includes a circumferential groove; and
    c) a head seal is disposed within said circumferential groove.

11. An oil filter assembly as in claim 6, wherein:
    a) said central opening of said cap includes a frusto-conical surface; and
    b) said seal is engaged by said frusto-conical surface when said filter element is attached to said orifice fitting.

12. An oil filter assembly as in claim 6, wherein said pins are doweled radially into said orifice fitting.

13. An oil filter assembly as in claim 11, wherein:
    a) said orifice fitting includes a radial flange; and
    b) said seal is disposed below said flange.

14. An oil filter assembly as in claim 11, wherein said seal is an O-ring.

15. An oil filter assembly as in claim 6, wherein said canister is screwed to said filter head.

* * * * *